April 28, 1953  C. W. LAURITZEN  2,636,657
APPARATUS FOR SEALING AND EVACUATING CONTAINERS
Original Filed Nov. 21, 1944
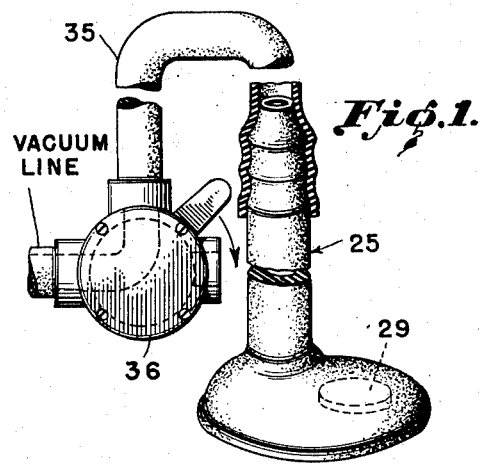
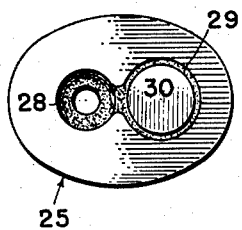
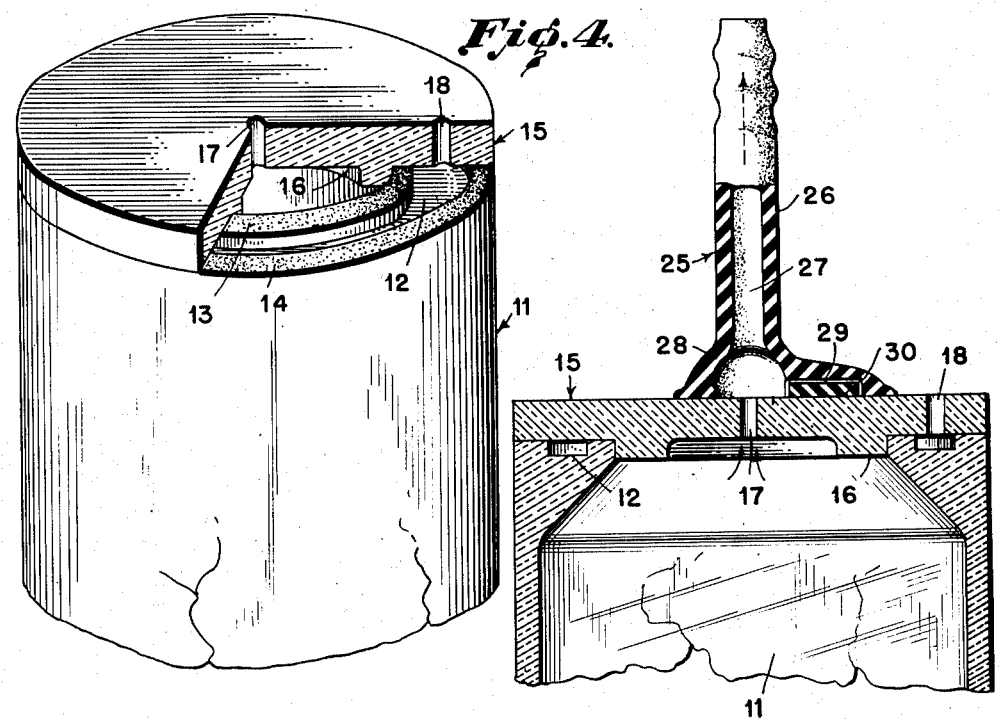
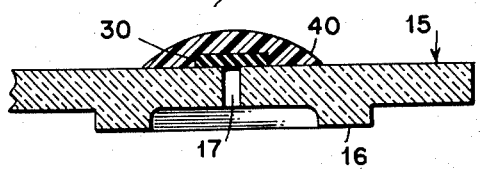
Inventor
C. W. LAURITZEN

UNITED STATES PATENT OFFICE 2,636,657

APPARATUS FOR SEALING AND EVACUATING CONTAINERS

Cyril W. Lauritzen, Logan, Utah

Original application November 21, 1944, Serial No. 564,498. Divided and this application January 7, 1949, Serial No. 69,763

4 Claims. (Cl. 226—82)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This application is a division of my copending application for patent, Serial No. 564,498, filed November 21, 1944, now abandoned.

This invention relates to the preservation of food products, and in particular to food containers, with special reference to the sealing thereof, and to the apparatus for their evacuation, and has among its objects the production of simple and efficient means for this purpose, and as such other objects as may be apparent from the following description and claims.

In general, the invention comprises a food container with a lid, in which a sealing means is provided by a groove between the container and lid, and which groove may be evacuated through an aperture in the lid, thus to hold the lid under pressure on the container and produce a seal at each rim of the groove. The invention also comprises an evacuating attachment which carries a sealing element so that, after evacuation, the attachment may be slid over the aperture and the sealing element slid on it to prevent ingress of air.

Referring to the annexed drawing:

Figure 1 is a three-dimensional view of the evacuating apparatus, including the evacuating attachment which contains the sealing element;

Figure 2 is a longitudinal section of the container with all parts in position preparatory to evacuation;

Figure 3 is a plan view looking upwards on the evacuating attachment of Figure 1;

Figure 4 is a three-dimensional view of the upper part of the container prior to evacuation, with a portion of the lid cut away; and Figure 5 is a longitudinal sectional view of part of the top of the container showing the container finally sealed.

Referring to the drawing, 11 is a container which, while preferably constructed of glass, may be constructed of any rigid material. The lip of container 11 has an annular groove 12 therein, thus providing an inner rim 13 and an outer rim 14 on each side of groove 12. This groove 12 provides an air space which, in the operation of my invention, is evacuated. The upper surfaces of rims 13 and 14 are ground so as to mesh with the lower surfaces of lid 15 when the latter is placed thereon. The lid 15 of the container 11, also preferably constructed of glass, has a smooth flat upper surface with a ground lower surface which meshes with the ground rims. To assist in securing a more effective seal, a grease may be applied to the ground glass surfaces before they are fitted together. A jutting ledge 16, protruding from the lower surface of lid 15, is so constructed as to contact the inside of inner rim 13 for the purpose of holding the lid properly positioned on the container. Lid 15 is provided with apertures 17 and 18, both surrounded by a smooth, flat surface, aperture 17 being centrally located and used for evacuating the content-space of the container. Although aperture 17 may be in any wall of the container, aperture 18 falls over the annular groove 12 and is the means through which the groove is evacuated.

An evacuating attachment 25 has an upper stem 26 with a hollow interior 27, and a vacuum cup 28 at its lower end, which communicates with the interior 27, said cup having a flat surface at its open end. Figure 2 illustrates the use of this attachment as applied to vacuum packing, but it is also used for evacuating through aperture 18.

The vacuum cup is so constructed as to provide a recess 29 within its wall for removably carrying the sealing element 30, which preferably is in the form of a flexible disc. The recess communicates with the flat surface of the cup and the disc lies in position on the smooth surface of the top of lid 15. The entire evacuating attachment 25, when placed on the smooth top surface of the lid and directly over aperture 17, as shown in Figure 2, forms an airtight, sliding engagement with the smooth surface of the top of the lid.

The free end of the stem of the evacuating attachment 25 is attached to a conventional evacuating apparatus through flexible tube 35.

The evacuating apparatus has a three-way control valve 36, providing for communication of the evacuating attachment either with a vacuum line or with the atmosphere.

Figure 2 shows the entire apparatus in position for vacuum packing through aperture 17, but the same principle is involved if evacuation be effected through aperture 18.

At the beginning of evacuation, the evacuating attachment, coupled to the evacuating apparatus, is positioned as shown in Figure 2. The control valve 36 is then opened to connect the attachment with the vacuum line and the evacuating process begun. When the desired pressure within container 11 is reached, the evacuating attachment is slid along the smooth surface of the lid until the disc 30 covers aperture 17 to close it. The structure relative to the recess 29 provides a simple means for carrying the sealing disc and is a structure which prevents ingress of air through the aperture while moving the disc to cover the aperture. The control valve 36 is then opened to the atmosphere and when atmospheric pressure has been restored to the upper surface of the disc 30, a temporary seal of aperture 17 has been effected. The evacuating attachment 25 is then removed and a coating of melted wax 40 is applied over disc 30 to effect a permanent seal. A permanent seal of aperture 18 may be effected in the same manner as that described for the sealing and closing of aperture 17.

In the event that the annular groove and the content space of the container are both evacuated through apertures 18 and 17, respectively, a double seal of the container is effected. Thus, should leakage occur at either of the seals on the rims, the contents of the container will still remain protected by the other seal.

Having thus described my invention, what is claimed is:

1. A combination of a container having an aperture in its wall surrounded by a smooth, flat surface, and an evacuating attachment having a hollow stem at one end for connection to a vacuum line, said hollow stem communicating at its other end with a vacuum cup having a flat surface at its open end, the flat surface of the open end of the cup having sliding, sealing engagement with the smooth, flat surface of the wall around the aperture, a recess within the wall of the vacuum cup communicating with the flat surface of the open end of the said cup, and a sealing element removably carried within the said recess whereby, after evacuation through the aperture, the attachment may be slid along the smooth, flat surface of the wall until the sealing element covers the aperture, thus effectively sealing the container.

2. An apparatus for sealing and evacuating a container having an aperture in its wall surrounded by a smooth, flat surface, comprising an evacuating attachment which has a hollow stem at one end for connection to a vacuum line, said hollow stem communicating at its other end with a vacuum cup having a flat surface at its open end, the flat surface of the open end of the cup having sliding, sealing engagement with the smooth, flat surface of the wall when placed thereon around the aperture, a recess within the wall of the vacuum cup communicating with the flat surface of the open end of the said cup, and a sealing element removably carried within the said recess of the cup, whereby after evacuation of the container through the aperture, the attachment may be slid along the smooth, flat surface of the wall until the sealing element covers the aperture, thus effectively sealing the container.

3. The apparatus of claim 2 wherein the sealing element is a flexible disc.

4. An apparatus for sealing and evacuating a container, having an aperture in its wall surrounded by a smooth, flat surface, comprising a vacuum cup which provides for connection to a vacuum line at one end, and has a flat surface at its open end, said flat surface having sliding, sealing engagement with the smooth, flat surface of the wall when placed thereon around the aperture, a recess within the wall of the vaccum cup communicating with the flat surface of the open end of the said cup, and a sealing element removably carried within the said recess of the cup, whereby, after evacuation through the aperture, the vacuum cup may be slid along the smooth flat surface of the wall until the sealing element covers the aperture, thus effectually sealing the container.

CYRIL W. LAURITZEN.

References Cited in the file of this patent

UNITED STATES PATENTS

| Number | Name | Date |
| --- | --- | --- |
| 76,917 | Holden | Apr. 21, 1868 |
| 228,999 | Johnson | June 22, 1880 |
| 234,674 | Ingersoll et al. | Nov. 23, 1880 |
| 711,212 | Honiss | Oct. 14, 1902 |
| 757,895 | Davis | Apr. 19, 1904 |
| 843,846 | Reed | Feb. 12, 1907 |
| 2,349,588 | Brand | May 23, 1944 |